(12) United States Patent
Ledford

(10) Patent No.: US 7,438,510 B1
(45) Date of Patent: Oct. 21, 2008

(54) APPARATUS AND METHOD FOR SECURING A PALLET JACK

(76) Inventor: Wade M. Ledford, 1451 Week Dr., NE., Cleveland, TN (US) 37312

( * ) Notice: Subject to any disclaimer, the term of this patent is extended or adjusted under 35 U.S.C. 154(b) by 104 days.

(21) Appl. No.: 11/015,155

(22) Filed: Dec. 17, 2004

(51) Int. Cl.
*B60P 7/08* (2006.01)

(52) U.S. Cl. .................. 410/3; 410/7; 410/23; 410/96; 410/97; 410/106

(58) Field of Classification Search .............. 410/7, 410/8, 10–12, 3, 23, 96, 97, 100, 102, 104, 410/106, 116; 248/499; 224/568; 24/265 CD, 24/68 CD
See application file for complete search history.

(56) References Cited

U.S. PATENT DOCUMENTS

| | | | |
|---|---|---|---|
| 2,970,358 A | 2/1961 | Elsner | |
| 3,429,537 A | 2/1969 | Jantzen | |
| 4,688,843 A | 8/1987 | Hall | |
| 4,826,193 A | 5/1989 | Davis | |
| 5,078,364 A | 1/1992 | Harrell | |
| 5,516,245 A | 5/1996 | Cassidy | |
| 5,752,791 A | 5/1998 | Ehrlich | |
| 5,934,849 A | 8/1999 | Haire | |
| 6,106,205 A | 8/2000 | Haire | |
| 6,109,846 A | 8/2000 | Davis et al. | |
| 6,149,370 A | 11/2000 | DiBartolomeo | |
| 6,213,696 B1 | 4/2001 | Austin | |
| 6,220,562 B1 | 4/2001 | Konkle | |
| 6,299,184 B1 | 10/2001 | Krawczyk | |
| 6,422,794 B1 | 7/2002 | Zhan et al. | |
| 6,666,635 B2 * | 12/2003 | Holt et al. | .......... 410/115 |
| 2002/0101049 A1 | 8/2002 | Krawzayk et al. | |

* cited by examiner

*Primary Examiner*—Stephen Gordon
(74) *Attorney, Agent, or Firm*—Chambliss, Bahner & Stophel, P.C.

(57) ABSTRACT

An anchoring device including a mounting bracket adapted to be attached to an object. The mounting bracket has a slot. The anchoring device also includes an end clip adapted to be removably connected to a first mounting structure. The anchoring device further includes a strap extending between the end clip and the mounting bracket and an anchoring ring adapted to be connected to a second mounting structure. The anchoring ring is attached to the strap between the mounting bracket and the end clip. The end clip is adapted to be removably retained in the slot of the mounting bracket when the object is secured to the second mounting structure by the anchoring ring. In addition, a method for removably securing a pallet jack to an inside wall of a tractor trailer. The method includes providing a pallet jack anchoring device, securing the pallet jack mounting bracket to a pallet jack, and securing the end clip to a first mounting structure.

4 Claims, 7 Drawing Sheets

APPARATUS AND METHOD FOR SECURING A PALLET JACK

FIELD OF THE INVENTION

The present invention relates generally to devices and methods for securing objects, and particularly to devices and methods for securing a pallet jack in the cargo area of a tractor trailer.

BACKGROUND AND DESCRIPTION OF THE PRIOR ART

It is known to use a variety of devices and methods for securing objects in the cargo area of a tractor trailer. For example, it is known to secure objects in the cargo area of a tractor trailer using devices having a strap with an end clip adapted to be removably received in a slot in a mounting structure such as the tracking plate commonly known as an E-track which is mounted to a fixed structure such as an inside wall of a tractor trailer. See e.g., U.S. Pat. No. 6,109,846 of Davis, et al.; U.S. Pat. No. 6,106,205 of Haire; U.S. Pat. No. 5,752,791 of Ehrlich; U.S. Pat. No. 4,826,193 of Davis; U.S. Pat. No. 3,429,536 of Jantzen; and U.S. Pat. No. 2,970,358 of Elsner. It is also known to use devices having anchoring rings for securing objects to an inside wall of the cargo area of a tractor trailer using rope and the like. See e.g., U.S. Pat. No. 6,213,697 of Austin; U.S. Pat. No. 6,106,205 of Haire; and U.S. Pat. No. 5,934,849 of Haire.

However, conventional devices and methods for securing objects in the cargo area of a tractor trailer suffer from one or more disadvantages. For example, none of the conventional devices or methods for securing an object to an inside wall of a tractor trailer are adapted to secure a pallet jack. In addition, none of the conventional devices or methods are adapted to be used with a tractor trailer having mounting structures such as D-rings mounted to an inside wall of the cargo area and a tractor trailer having E-tracks mounted to an inside wall of the cargo area. Further, none of the conventional devices and methods are adapted to removably retain the end clip in a slot in the mounting bracket while an anchoring ring is being used to anchor the object to an inside wall of the tractor trailer. Still further, none of the conventional devices and methods provide an end clip and an anchoring ring in an integral device. In addition, none of the conventional devices and methods are adapted to secure a pallet jack to an inside wall of a tractor trailer by attachment to the head of a pallet jack.

It would be desirable, therefore, if an apparatus and method for securing an object in the cargo area of a tractor trailer could be provided that would secure a pallet jack to an inside wall of the cargo area of a tractor trailer. It would also be desirable if such an apparatus and method could be provided that would be adapted for use with a tractor trailer having mounting structures such as D-rings mounted to an inside wall of the tractor trailer and a tractor trailer having an E-track mounted to an inside wall of the tractor trailer. It would be further desirable if such an apparatus and method could be provided that would be adapted to removably retain the end clip in a slot in the mounting bracket while the anchoring ring is being used to anchor the object to an inside wall of the tractor trailer. It would be still further desirable if such an apparatus and method could be provided that would be adapted to provide an end clip and an anchoring ring in an integral device. It would also be desirable if such an apparatus and method could be provided that would be adapted to removably secure a pallet jack to an inside wall of a tractor trailer by attachment to the head of a pallet jack. It would be further desirable is such an apparatus and method could be provided that would be adapted to secure a cargo load to a pallet jack and permit a pallet jack to be secured to a distant mounting structure.

ADVANTAGES OF THE INVENTION

Accordingly, it is an advantage of the invention claimed herein to provide an apparatus and method for securing a pallet jack to an inside wall of the cargo area of a tractor trailer. It is also an advantage of the invention to provide an apparatus and method for securing a pallet jack to a mounting structure such as a D-ring mounted to an inside wall of a tractor trailer and/or an E-track mounted to an inside wall of a tractor trailer. It is a further advantage of the invention to provide an apparatus and method for removably retaining an end clip in a slot in the mounting bracket while an anchoring ring is being used to anchor the pallet jack to an inside wall of a tractor trailer. It is a still further advantage of the invention to provide an apparatus and method that would to provide an end clip and an anchoring ring in an integral device. It is yet another advantage of the invention to provide an apparatus and method adapted to be removably secured to the head of a pallet jack. It is also an advantage of the invention to provide an apparatus and method adapted to secure a cargo load to a pallet jack and permit a pallet jack to be secured to a distant mounting structure.

Additional advantages of the invention will become apparent from an examination of the drawings and the ensuing description.

EXPLANATION OF TECHNICAL TERMS

As used herein, the term "anchoring ring" refers to any structural device that is adapted to be attached to the anchoring device of the invention and connected to a mounting structure that may be mounted to a fixed object. The term "anchoring ring" includes structural devices such as D-rings, O-rings, karabiners, hooks and the like. The term "anchoring ring" also includes structural devices that are adapted to be connected directly to a mounting structure that may be mounted to a fixed object and structural devices that are adapted to be connected via a rope, strap, cord and the like to mounting devices that may be mounted to a fixed object.

As used herein, the term "end clip" refers to any device that is adapted to be attached to the anchoring device of the invention and releasably connected to a mounting structure that may be mounted to a fixed object. The term "end clip" includes, but is not limited to, devices that are adapted to be releasably connected to a mounting structure such as the tracking plate commonly known as an "E-track." The term "end clip" may also include devices that are adapted to be releasably attached to other types of tracking plates or similar mounting structures.

SUMMARY OF THE INVENTION

The apparatus of the invention comprises an anchoring device. The anchoring device includes a mounting bracket adapted to be attached to an object. The mounting bracket has a slot. The anchoring device also includes an end clip adapted to be removably connected to a first mounting structure. The anchoring device further includes a strap extending between the end clip and the mounting bracket and an anchoring ring adapted to be connected to a second mounting structure. The anchoring ring is attached to the strap between the mounting bracket and the end clip. In addition, the end clip is adapted to be removably retained in the slot of the mounting bracket when the object is secured to the second mounting structure by the anchoring ring.

In a preferred embodiment of the anchoring device of the invention, the anchoring device is adapted to removably secure a pallet jack to an inside wall of a tractor trailer. The preferred anchoring device includes a pallet jack mounting bracket having a first arm with a first arm hinge end, a first arm distal end and a first arm slot, a second arm with a second arm hinge end, a second arm distal end and a second arm slot, a hinge hingedly connecting the first arm hinge end to the second arm hinge end, and a locking means adapted to engage the first arm and the second arm into a bearing relationship with a pallet jack head.

The invention further comprises a method for removably securing a pallet jack to an inside wall of a tractor trailer. The method of the invention comprises providing a pallet jack anchoring device. The pallet jack anchoring device includes a pallet jack mounting bracket adapted to be attached to a pallet jack. The pallet jack mounting bracket has a slot. The pallet jack anchoring device also includes an end clip adapted to be removably connected to a first mounting structure which is mounted on the inside wall of the tractor trailer. The pallet jack anchoring device further includes a strap extending between the mounting bracket and the end clip, and an anchoring ring adapted to be removably connected to a second mounting structure mounted on the inside wall of a tractor trailer. The anchoring ring is attached to the strap between the end clip and the mounting bracket. The method further comprises securing the pallet jack mounting bracket to the pallet jack and securing the end clip to the first mounting structure. In a preferred embodiment of the method of the invention, the method comprises securing the end clip to the slot in the pallet jack mounting bracket and securing the anchoring ring to the second mounting structure.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
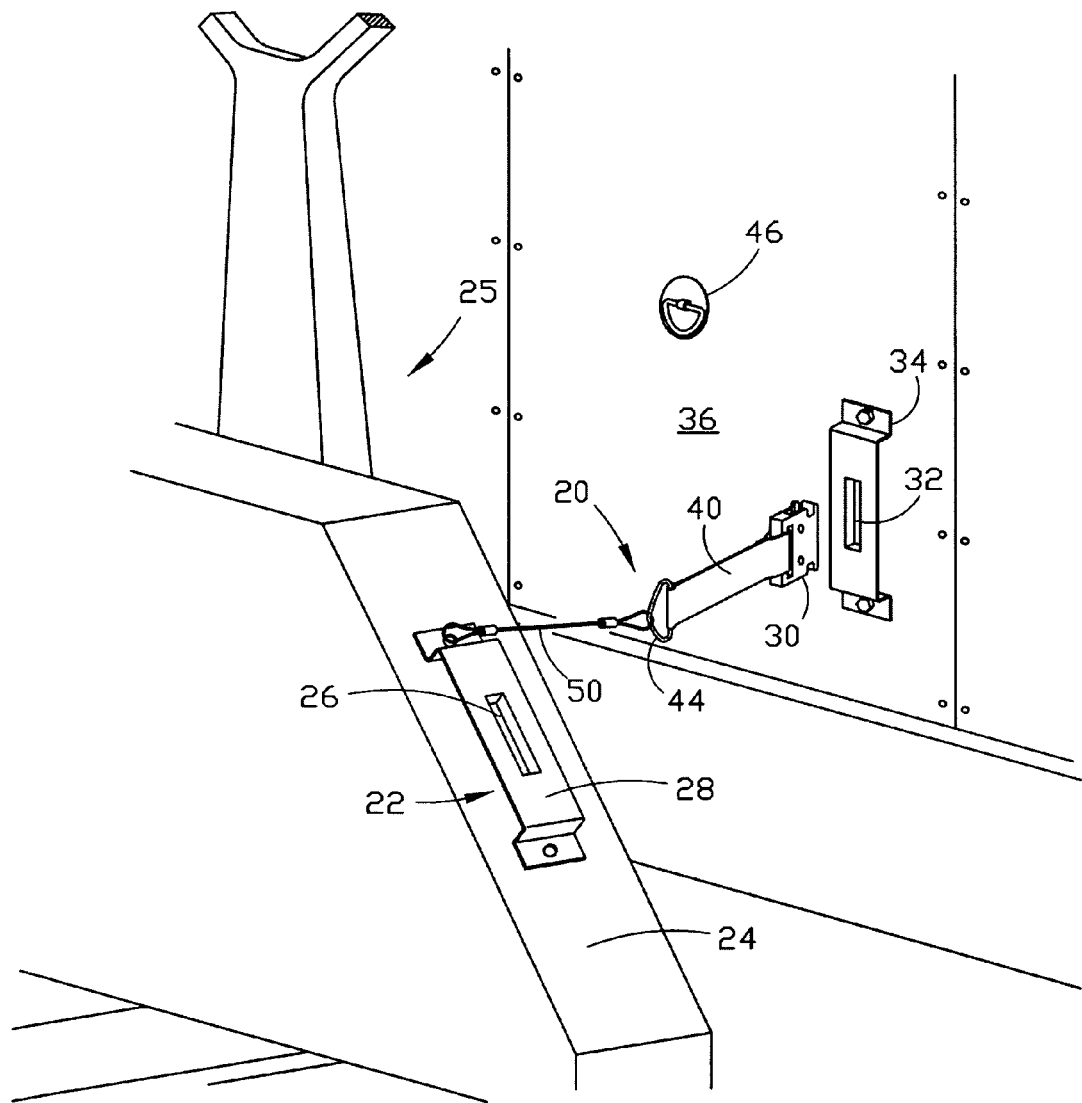
FIG. 1 is a perspective view of a preferred embodiment of the anchoring device of the invention shown mounted on the head of a pallet jack and illustrating an E-track mounted on an inside wall in the cargo area of a tractor trailer.

Referring now to the drawings, the preferred embodiments of the anchoring device of the invention are illustrated by FIGS. 1 through 7. As shown in FIG. 1, the preferred anchoring device is designated generally by reference numeral 20. More particularly, preferred anchoring device 20 includes mounting bracket 22 which is adapted to be attached to an object such as head 24 of pallet jack 25. Mounting bracket 22 may be attached to head 24 by threaded fasteners, rivets, welding or any other suitable means. As shown in FIG. 1, the preferred mounting bracket 22 includes slot 26 and raised portion 28 which are adapted to removably retain end clip 30. As discussed in more detail below and shown in the other Figures, it is contemplated within the scope of the invention that the mounting bracket may be any suitable configuration adapted to be attached to an object such as a pallet jack head and removably retain an end clip.

Still referring to FIG. 1, end clip 30 is also adapted to be removably retained in a first mounting structure such as slot 32 in E-track 34 mounted to inside wall 36 of a tractor trailer. While E-track 34 is illustrated in a vertical disposition in FIG. 1, it is understood that the preferred anchoring device 20 is suitable for use with an E-track mounted in a horizontal disposition or any disposition between horizontal and vertical. It is further contemplated within the scope of the invention that the end clip may be any suitable configuration adapted to be removably retained in a mounting structure such as the tracking plate commonly known as an E-track which is mounted to a fixed structure such as the inside wall of a tractor trailer.

Still referring to FIG. 1, end clip 30 is attached to strap 40. Strap 40 is preferably flexible nylon, but it is contemplated within the scope of the invention that the strap may be made from any suitable material. It is also contemplated that end clip 30 may be attached to a coupling ring which is attached to strap 40. More particularly, in a preferred embodiment, the anchoring device of the invention employs an end clip arrangement such as the arrangement sold by ANCRA® under the product name "E & A Fittings with D-Rings" identified as "Series F1018". Further, it is contemplated within the scope of the invention that strap 40 may be adjustable in length by employing any suitable device commonly used for making straps adjustable such as a ratcheting device, a buckle and hole arrangement, and the like.

Figure 2:
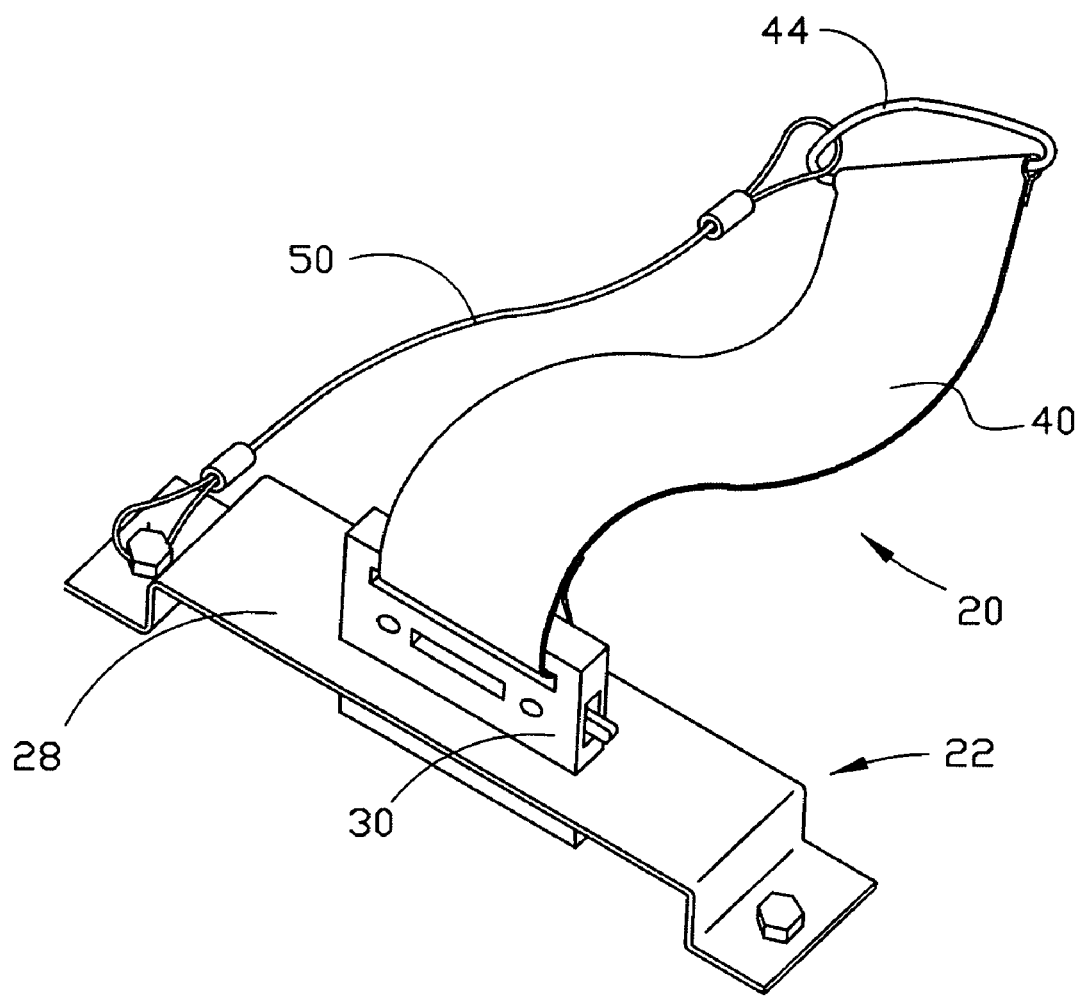
FIG. 2 is a perspective view of the preferred embodiment of the anchoring device illustrated in FIG. 1 shown with the end clip secured in the mounting bracket slot.

Referring still to FIG. 1, the preferred anchoring device 20 also includes an anchoring ring such as D-ring 44. The preferred D-ring 44 is attached to strap 40. The preferred D-ring 44 is adapted to be connected to a second mounting structure such as D-ring mount 46 which is mounted to a fixed structure such as inside wall 36 of a tractor trailer. D-ring 44 is preferably connected to D-ring mount 46 with a rope (as shown in FIG. 2) or a non-metal strapping or tie-down such as those sold by THE ORIGINAL BUNGEE COMPANY®, but it is contemplated within the scope of the invention that any suitable device may be used to connect the D-ring to the D-ring mount. Further, it is contemplated that connecting components such as O-rings, karabiners, hooks and the like may be used in place of D-ring 44.

Figure 6:
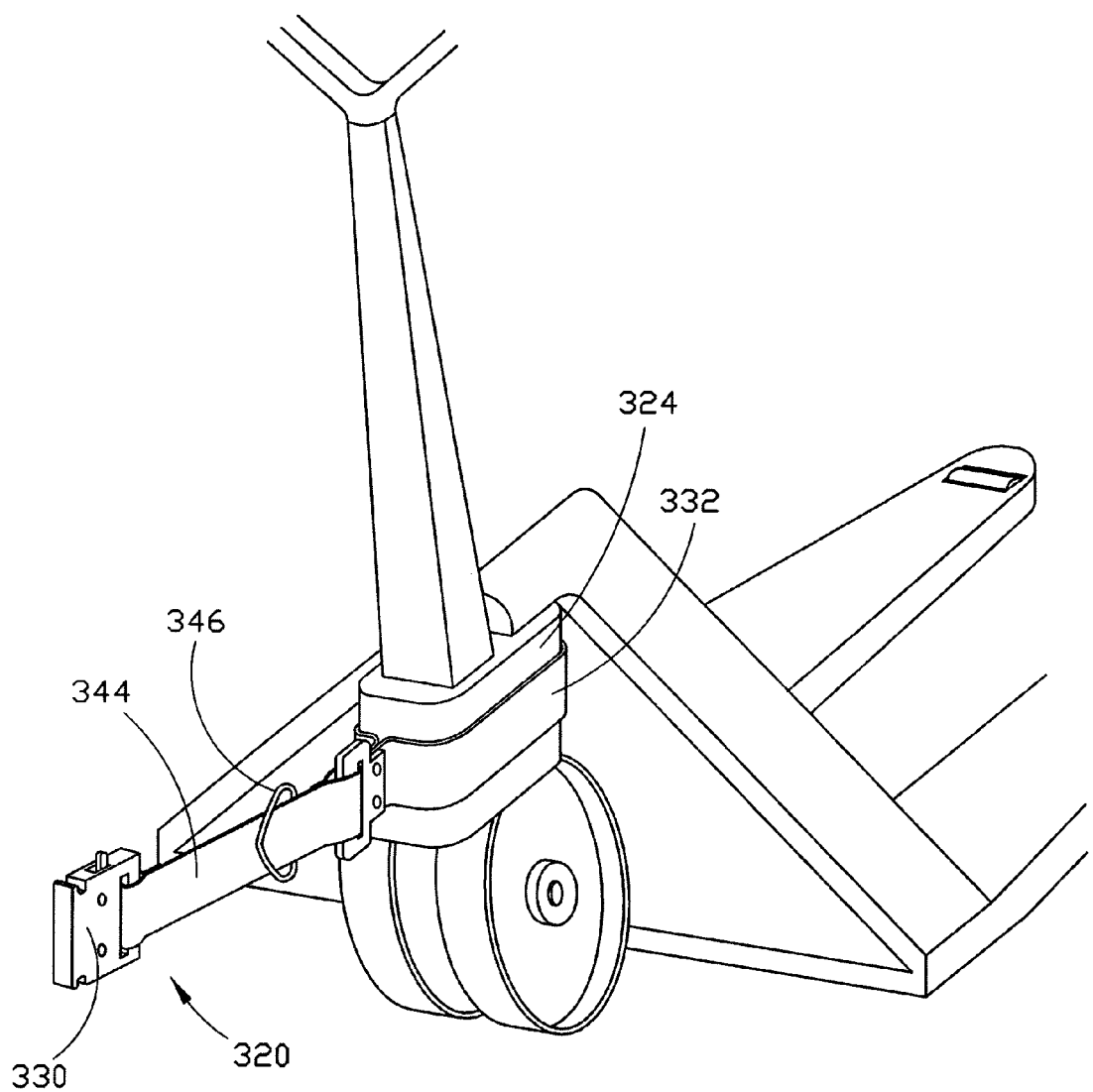
FIG. 6 is a perspective view of a third alternative embodiment of the anchoring device of the invention shown mounted on the head of a pallet jack.
Figure 7:
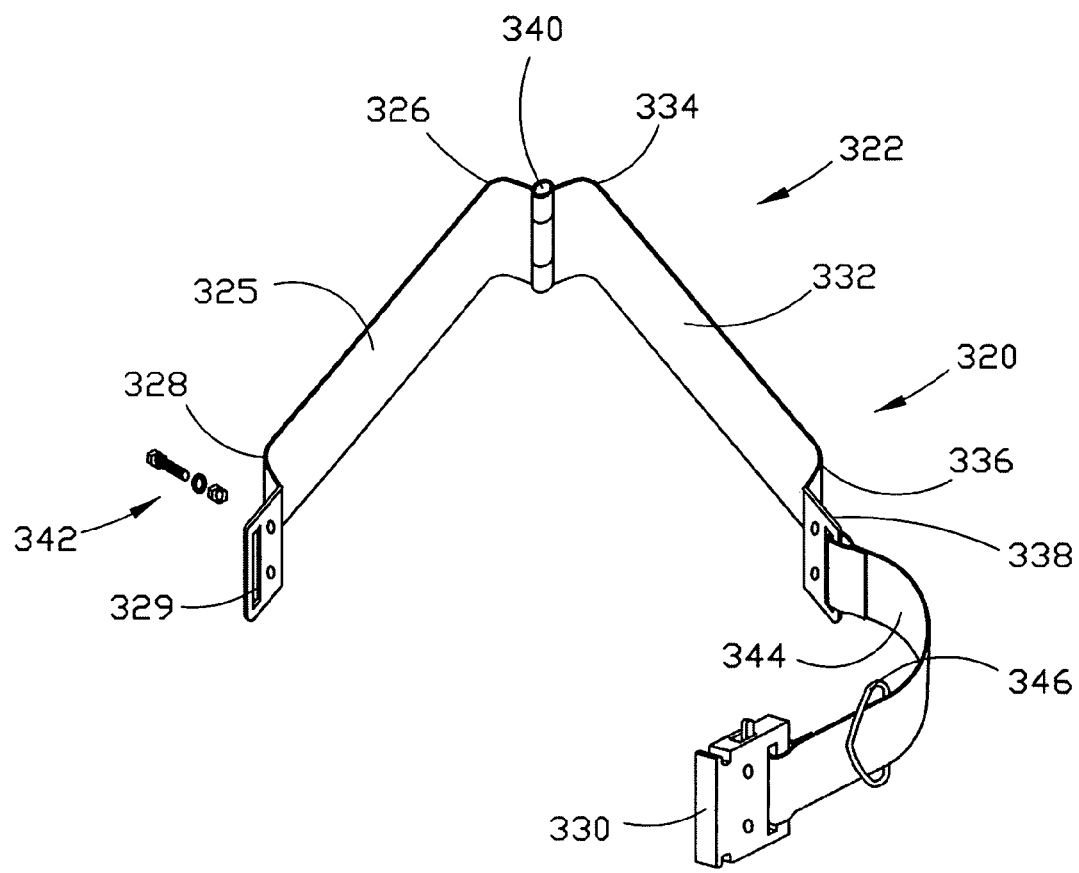
FIG. 7 is a perspective view of a portion of the preferred embodiment of the anchoring device illustrated in FIG. 6.

Referring still to FIG. 1, the preferred anchoring device 20 also includes cable 50. The preferred cable 50 extends between D-ring 44 and mounting bracket 22. The preferred cable 50 connects D-ring 44 to mounting bracket 22. While FIG. 1 illustrates cable 50 attaching D-ring 44 to mounting bracket 22, it is contemplated within the scope of the invention that the end clip and the D-ring may be connected to the mounting bracket by one or more straps, as shown in FIGS. 3 and 6 and discussed below in more detail.

Referring now to FIG. 2, a perspective view of the preferred anchoring device 20 is shown with end clip 30 secured in the slot of mounting bracket 22. As can be appreciated from FIG. 2, anchoring device 20 may be used to anchor an object such as a pallet jack in the cargo area of a tractor trailer which is not equipped with an E-track system or the like. In such a circumstance, end clip 30 may be secured in the slot of mounting bracket 22, and D-ring 44 may be tied to a mounting device such as another D-ring or the like which is secured to an inside wall of a tractor trailer. Further, in such a circumstance, end clip 30 is secured in the slot of the mounting bracket so as not to damage the pallet jack, the tractor trailer or any cargo in the tractor trailer.

Figure 3:
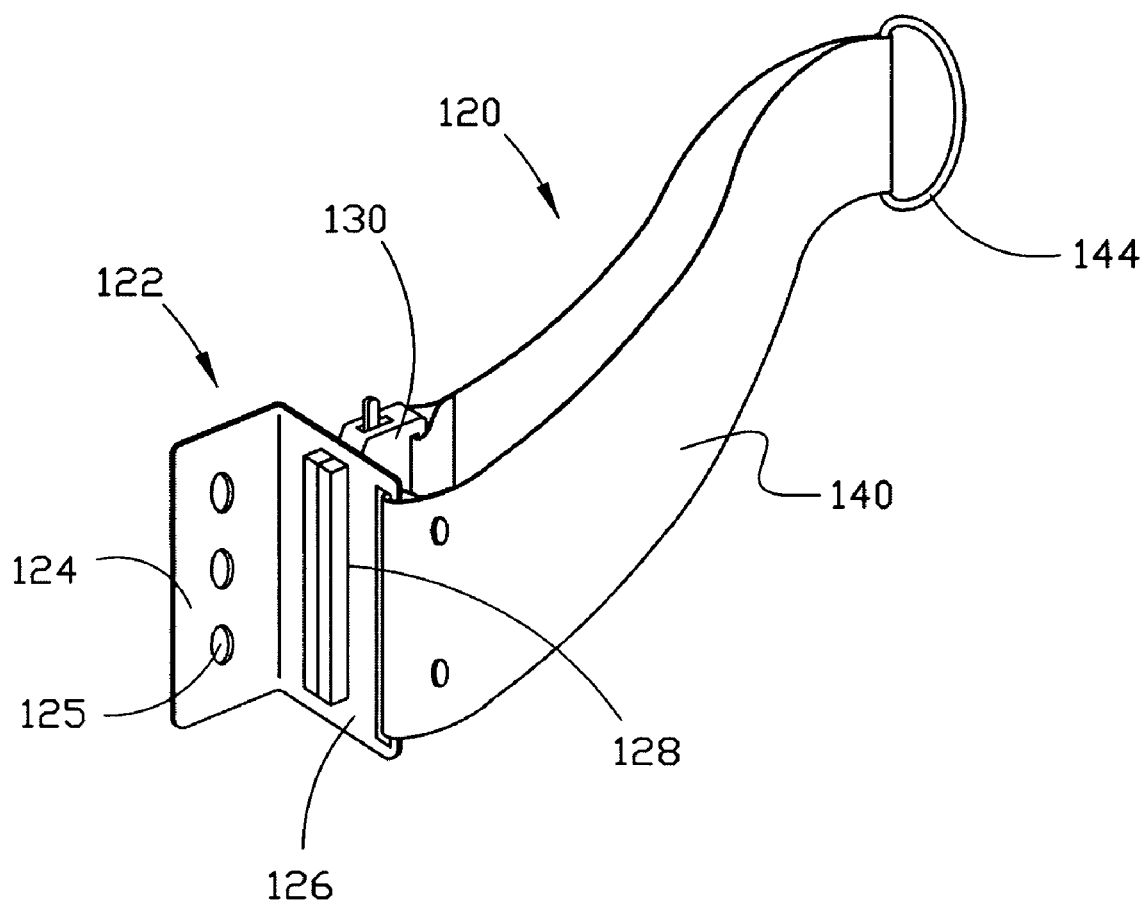
FIG. 3 is a perspective view of a first alternative embodiment of the anchoring device of the invention shown with the end clip secured in the mounting bracket slot.

Referring now to FIG. 3, a perspective view of a first alternative embodiment of the anchoring device of the invention is illustrated. More particularly, FIG. 3 illustrates a preferred embodiment of the anchoring device of the invention shown with the end clip secured in the slot of the mounting bracket which is in the general shape of an angle bracket. As shown in FIG. 3, the preferred anchoring device is designated generally by reference numeral 120. The preferred anchoring device 120 includes mounting bracket 122 which has mounting portion 124 and raised portion 126. Mounting portion 124 is adapted to be attached to an object such as a pallet jack head and may include mounting holes 125. The preferred raised portion 126 includes slot 128 which is adapted to removably retain end clip 130. The preferred end clip 130 is attached to strap 140. The anchoring ring, preferably D-ring 144, is attached to strap 140 between mounting bracket 122 and end clip 130.

Figure 4:
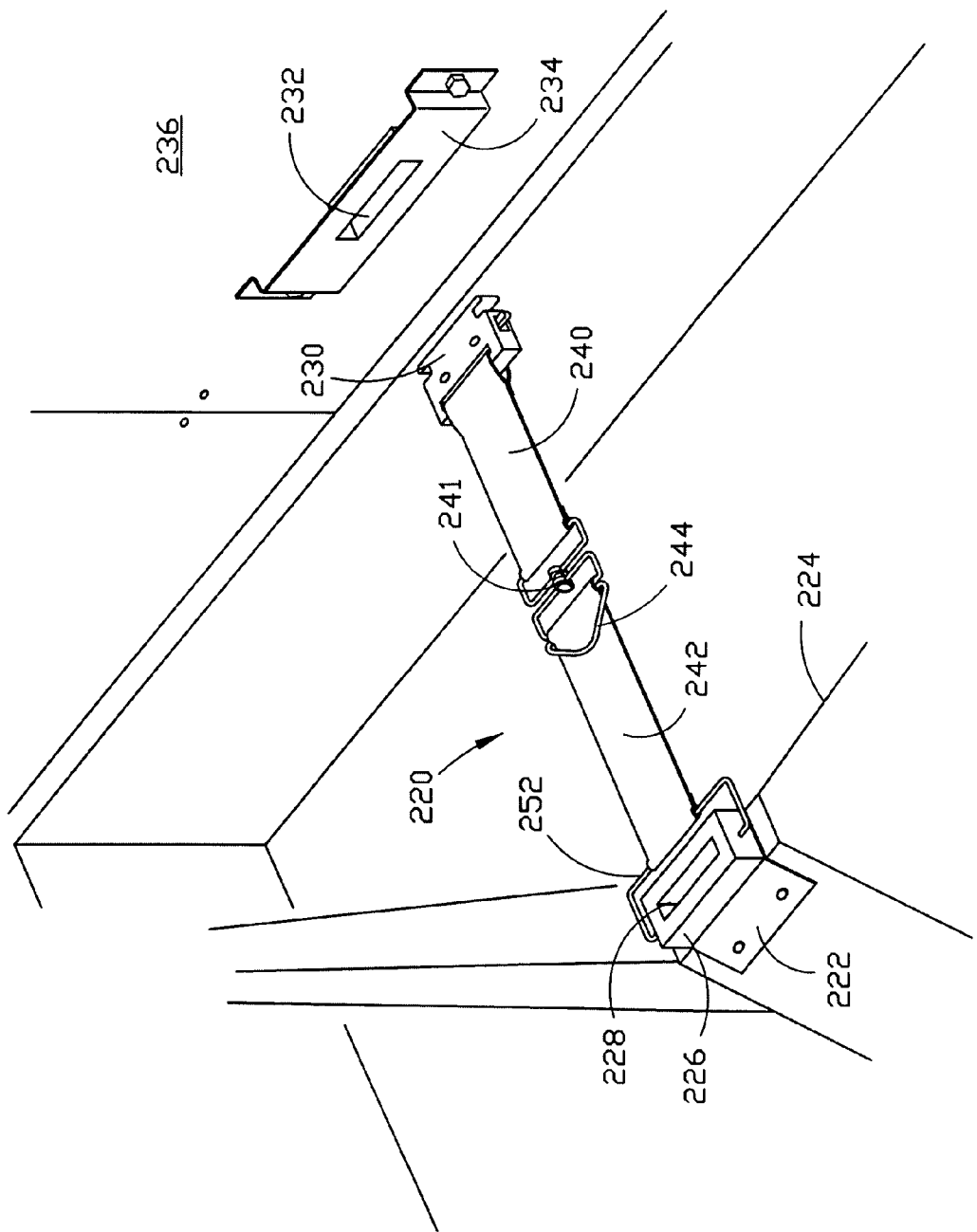
FIG. 4 is a perspective view of a second alternative embodiment of the anchoring device of the invention shown mounted on the head of a pallet jack and illustrating an E-track mounted on an inside wall in the cargo area of a tractor trailer.

Referring now to FIG. 4, a perspective view of a second alternative embodiment of the anchoring device of the invention is illustrated. More particularly, FIG. 4 illustrates a preferred embodiment of the anchoring device mounted on the head of a pallet jack and an E-track mounted on an inside wall in the cargo area of a tractor trailer. As shown in FIG. 4, the preferred anchoring device is designated generally by reference numeral 220. The preferred anchoring device 220 includes mounting bracket 222 which is mounted to pallet jack head 224. The preferred mounting bracket 222 includes raised portion 226 and mounting bracket slot 228. The preferred raised portion 226 and mounting bracket slot 228 are adapted to removably retain end clip 230. The preferred end clip 230 is adapted to be removably retained in track slot 232 of a first mounting structure such as E-track 234 mounted to inside wall 236 of a tractor trailer.

As shown in FIG. 4, the preferred end clip 230 is attached to first strap 240. The preferred swivel joint 241 is also attached to first strap 240. The preferred swivel joint 241 is adapted to permit first strap 240 and end clip 230 to be rotated such that end clip 230 may be aligned with track slot 232 and mounting bracket slot 228. The preferred swivel joint 241 is also attached to second strap 242. It is contemplated within the scope of the invention that any suitable connecting device may be used to rotatably connect first strap 240 to second strap 242. It is further contemplated within the scope of the invention that more than one such connecting device may be used to rotatably connect more than two such straps.

Still referring to FIG. 4, an anchoring ring such as preferred D-ring 244 is attached to second strap 242. It is contemplated within the scope of the invention, however, that the preferred D-ring 244 may be attached to first strap 240. The preferred second strap 242 is also connected to buckle 252 which is preferably hingedly connected to mounting bracket 222.

Figure 5:
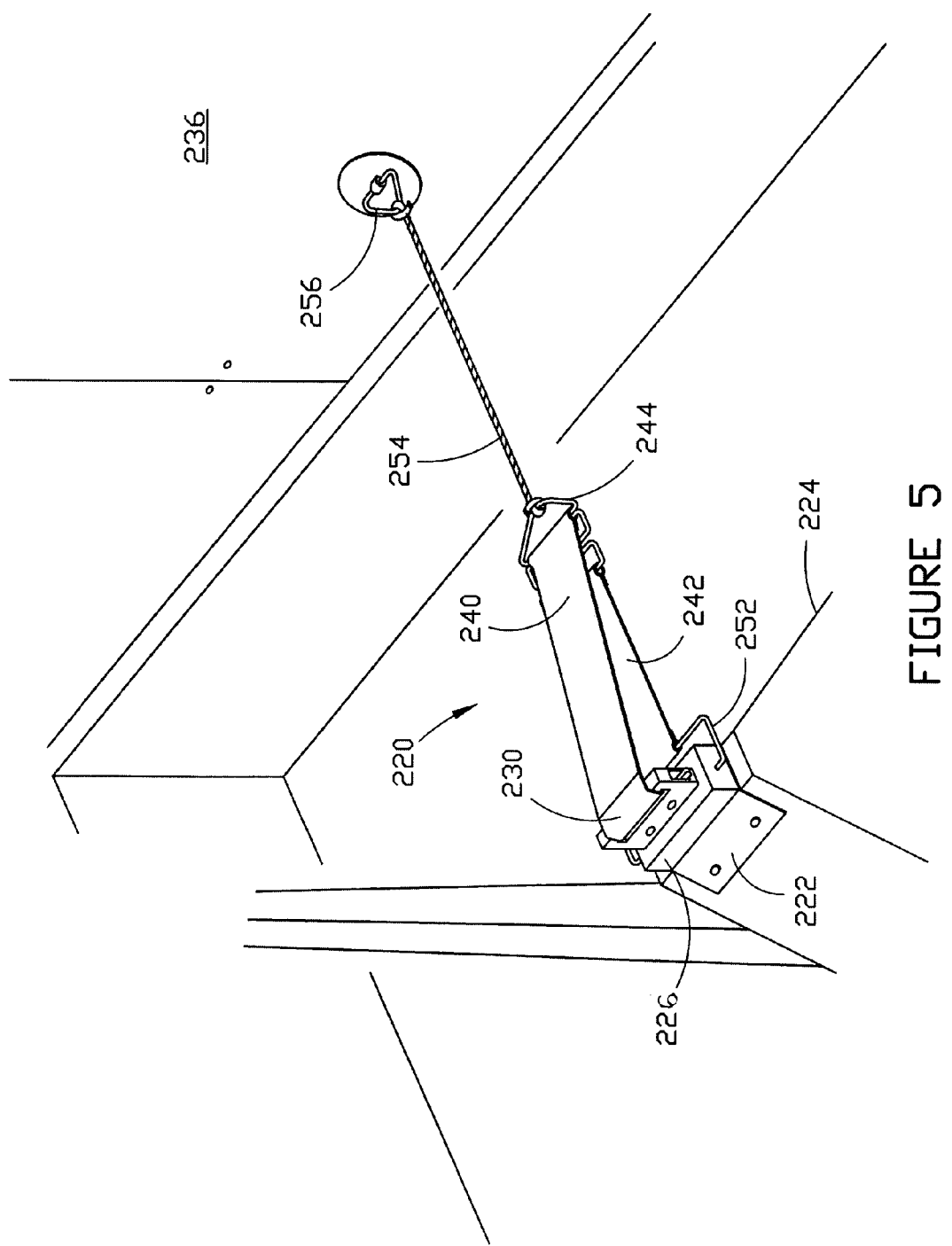
FIG. 5 is a perspective view of the preferred embodiment of the anchoring device illustrated in FIG. 4 shown with the end clip secured in the mounting bracket slot.

Referring now to FIG. 5, a perspective view of the preferred anchoring device 220 shown with the end clip secured in the mounting bracket slot is illustrated. More particularly, as shown in FIG. 5, the preferred end clip 230 is secured in the mounting bracket slot, and D-ring 244 is tied by rope 254 to mounting ring 256 which is mounted to inside wall 236 of a tractor trailer.

Referring now to FIG. 6, a perspective view of a third alternative embodiment of the anchoring device of the invention shown mounted on the head of a pallet jack is illustrated. As shown in FIG. 6, the preferred anchoring device is designated generally by reference numeral 320. The preferred anchoring device 320 includes mounting bracket 322 which is adapted to be removably mounted to an object such as pallet jack head 324. As shown more clearly in FIG. 7, the preferred mounting bracket 322 includes first arm 325 having first arm hinge end 326, first arm distal end 328 and first arm slot 329. The preferred mounting bracket 322 also includes second arm 332 having second arm hinge end 334, second arm distal end 336 and second arm slot 338. The preferred mounting bracket 322 further includes hinge 340 and a locking means such as threaded fastener, washer and nut combination 342. The preferred locking means is adapted to engage the first arm and the second arm into a bearing relationship with the pallet jack head. The preferred locking means is also adapted to substantially align the first arm slot with the second arm slot.

Referring again to FIG. 6, the preferred anchoring device 320 further includes strap 344 which preferably extends between mounting bracket 322 and end clip 330. The anchoring ring, preferably D-ring 346, is attached to strap 344 between end clip 330 and mounting bracket 322.

In operation, several advantages of the apparatus and method of the invention are achieved. For example, the apparatus and method of the invention provide an apparatus and method for securing a pallet jack to an inside wall of a tractor trailer. The invention also provides an apparatus and method for securing a pallet jack to a tractor trailer having a mounting structure such as a D-ring mounted to an inside wall of the tractor trailer and a tractor trailer having an E-track mounted to an inside wall of the tractor trailer. The invention also provides an apparatus and method for removably retaining the end clip in a slot in the mounting bracket while the anchoring ring is being used to anchor the pallet jack to an inside wall of the tractor trailer. In addition, the invention provides an apparatus and method for an anchoring device comprising an end clip and an anchoring ring in an integral device. Still further, the invention provides an apparatus and method for removably securing a pallet jack head to a fixed object such as an inside wall of a tractor trailer.

In addition, the apparatus of the invention is adapted to secure cargo loads to the pallet jack on which the anchoring device is mounted. More particularly, a cargo strap having on one end an end clip adapted to be retained in the slot in the mounting bracket of the anchoring device and on the other end a structure adapted to releasably receive the end clip of the anchoring device may be used to secure a cargo load to a pallet jack on which the anchoring device is mounted. In the alternative, the anchoring device of the invention may be used to secure a pallet jack to an E-track mounted on the inside wall of a tractor trailer at a distance greater than the length of the strap of the anchoring device. More particularly, a cargo strap having an end clip adapted to be releasably retained in an E-track on each of its opposing ends may be used to secure a pallet jack to an E-track mounted at a distance from the anchoring device which is greater than the length of the strap of the anchoring device. Using such a dual end clip cargo strap, one end of the cargo strap may be secured in the slot in the mounting bracket of the anchoring device and the other end of the cargo strap may be secured to an E-track mounted on the inside wall of a tractor trailer. Because such dual end clip cargo straps may be any desired length, E-tracks mounted distances from the anchoring device which are greater than the length of the strap of the anchoring device may be used to secure a pallet jack on which the anchoring device of the invention is mounted.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. An anchoring device, said device comprising:
   (a) a mounting bracket adapted to be attached to an object, said mounting bracket having a slot;
   (b) an end clip adapted to be removably connected to a first mounting structure;
   (c) a strap extending between the end clip and the mounting bracket, said strap having a longitudinal axis extending along a centerline between the end clip and the mounting bracket;
   (d) an anchoring ring adapted to be connected to a second mounting structure, said ring being attached to the strap between the mounting bracket and the end clip;
   wherein the end clip is adapted to be removably retained in the slot of the mounting bracket when the object is secured to the second mounting structure by the anchoring ring; and wherein the strap is connected to a buckle which is hingedly connected to the mounting bracket.

2. The device of claim 1 wherein the strap includes a swivel joint, said swivel joint being adapted to permit the strap to rotate substantially about the longitudinal axis of the strap.

3. An anchoring device for removably securing a pallet jack to an inside wall of a tractor trailer, said device comprising:
   (a) a pallet jack mounting bracket adapted to be attached to the pallet jack, said pallet jack mounting bracket having a slot;
   (b) an end clip adapted to be removably connected to a first mounting structure which is mounted on the inside wall of the tractor trailer;
   (c) a strap extending between the mounting bracket and the end clip, said strap having a longitudinal axis extending along a centerline between the end clip and the mounting bracket; and,
   (d) an anchoring ring adapted to be removably connected to a second mounting structure which is mounted on the inside wall of the tractor trailer, said anchoring ring being attached to the strap between the end clip and the mounting bracket;
   wherein the end clip is adapted to be removably retained in the slot of the mounting bracket when the pallet jack is secured by the anchoring ring to the second mounting structure; and wherein the strap is connected to a buckle which is hingedly connected to the pallet jack mounting bracket.

4. The device of claim 3 wherein the strap includes a swivel joint, said swivel joint being adapted to permit the strap to rotate substantially about the longitudinal axis of the strap.

* * * * *